Figure 1A:
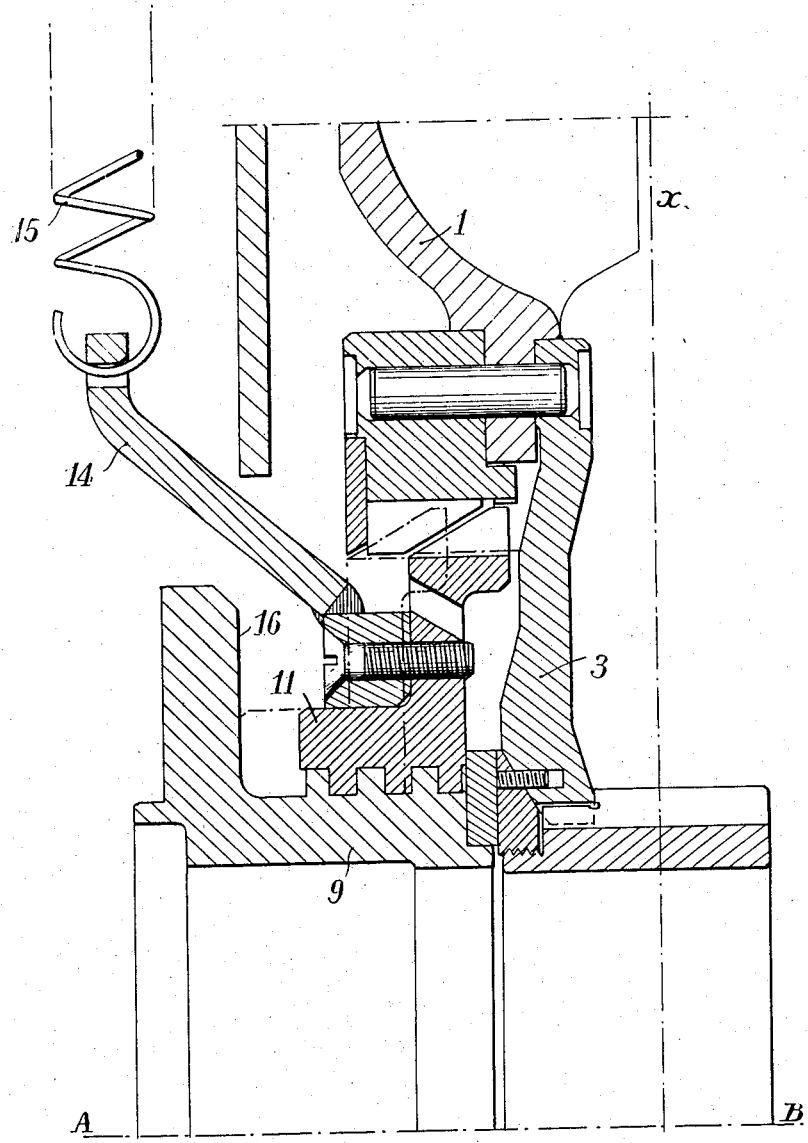

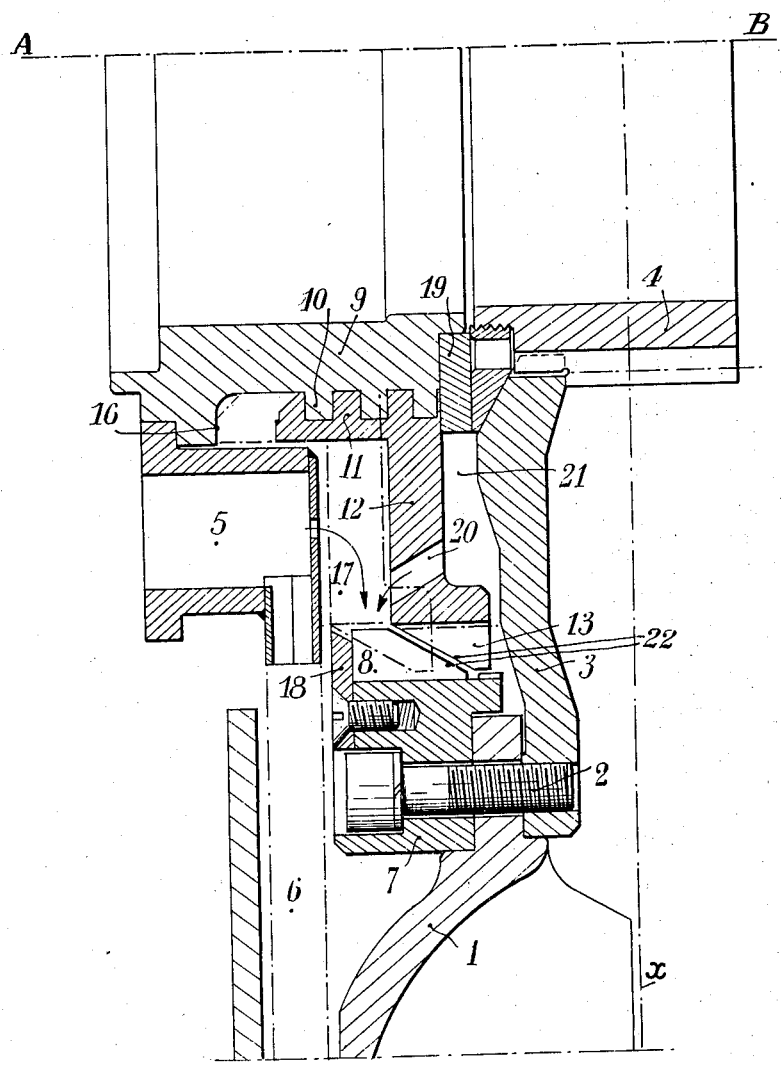

United States Patent Office 2,953,226
Patented Sept. 20, 1960

2,953,226

FREE WHEELING DEVICE

André Pelabon, Paris, France, assignor to Societe Anonyme dite: les Ateliers de Construction du Nord de la France, Crespin-Blanc-Misseron, France, a corporation of France Filed July 16, 1958, Ser. No. 749,021

Claims priority, application France Aug. 30, 1957

3 Claims. (Cl. 192—3.2)

The present invention relates to mechanical devices for coupling a driven member rotating about a shaft, to a fixed member when the driven member is at rest and for uncoupling them when the driven member rotates in a given direction. The members are coupled together by a dog clutch consisting of two rings of overlapping teeth. In certain cases, it is necessary to release the two members from one another, while running, in such a manner as to allow the driven member to "free-wheel." This release is obtained by means of a relative axial displacement of the two sets of teeth of the dog clutch until the teeth are no longer in mesh. It is important, particularly when the driven member rotates at very high speeds, that any movement of the two toothed rings towards one another should be rendered impossible because their contact would involve their destruction.

The present invention relates to a free-wheeling device for a member driven by a dog clutch which enables this safety precaution to be obtained by simple means.

In order to effect the separation of the teeth of the dog clutch, the invention relies on hydraulic pressure means and it is therefore particularly applicable to installations in which such hydraulic pressure means are already available.

The device according to the invention is applicable in particular, in hydraulic couplers in which, as is known, a hydraulic pressure is used to fill the coupler with liquid and thus to effect the hydraulic coupling of two rotors one of which constitutes a centripetal turbine and the other a centrifugal pump.

According to the invention, the two members carrying the teeth of the dog clutch are adapted so that they themselves operate in the manner of an auxiliary hydraulic coupler in which the engaging teeth constitute the vanes of the two rotors, the said auxiliary coupler being fed from the same source of hydraulic pressure as that which feeds the installation.

Other features of the device of the invention will become apparent from the following description of one embodiment specifically adapted to allow one of the rotors of a main hydraulic coupler to free-wheel. This description and the accompanying drawing which illustrates it, are given solely by way of example, it being understood that the invention is not limited to this single application.

Figs. 1 and 1a of the drawing, which join along line AB, represent an axial section of a hydraulic coupler, said section passing through the axis of the oil-filling aperture of the coupler.

At 1 there is seen a member in the form of substantially half a torus, which constitutes the centripetal turbine which is fixed by means of bolts 2 to a disc 3, in turn fixed to the hub 4. The complementary member which is in the form of substantially half a torus symmetrical with the above in relation to the plane x—x, and which constitutes the centrifugal pump, is not illustrated, as it is unnecessary for the description of the free-wheel device according to the invention. The oil under pressure for filling the coupler arrives through the aperture 5 in the conduit 6 which gives it access to the turbine 1.

The free-wheel device is constructed as follows:

The bolts 2 secure to the half-torus 1, not only the disc 3 but also a ring 7 which comprises internal teeth 8. On the other hand, on a hub 9, coaxial with the hub 4, there is cut a helicoidal thread 10 to which is screwed a nut 11, one end of which carries a plate 12 having teeth 13 which can engage between the teeth 8. In the engaged position, these two sets of teeth constitute the dog clutch mentioned above. This secures the hub 9 to the rotor elements 1, 3, 4. The engagement of the clutch is obtained by means of a lever 14 (Fig. 1a) rigidly secured to the nut 11, which is rotated towards the front or rear of the plane of the figure by a helical spring 15 attached to the end of said lever in the direction which, according to the pitch of the thread 10, causes the nut 11 to turn in the direction which displaces it towards the left to bring it into abutment against the flange 16. In this position, the teeth 8 and 13 are fully engaged. Such dog-clutch engagement devices are already known. The other end of spring 15 is fixed to hub 9.

According to the essential characteristic of the invention, the two members 7 and 12 carrying the dog-clutch members are adapted to operate in the manner of a hydraulic coupler when the rotor consisting of elements 1, 3, 4 tends to turn as a free wheel. The beginning of the rotation of the rotor has the effect of causing the plate 12, which occupied the position shown in chain line, to move back towards the stop ring 19, fixed to the hub 9 until the teeth 8 and 13 are no longer in contact except by their edges 22. In this position, the helical spring 15 maintains said contact in order to effect the re-engagement in the event of the reverse rotation of the rotor.

The oblique faces of the teeth 8 and 13 have an interrupted surface so that the action of the spring 15 causes a series of shocks on the passage of each tooth, which is only permissible at low speeds of rotation.

It is the main object of the invention to disconnect the teeth 8 and 13 completely as soon as the speed of the teeth 8 increases.

For this purpose, some of the oil filling the main coupler is admitted into the space 17. A baffle 18 closes the rear face of the teeth 8 and the oil, urged by centrifugal force, fills the gaps between the teeth 8 and 13. This oil having attained the same tangential speed as the teeth 8 and under the pressure due to centrifugal force, tends to fill the gaps between the teeth 13 where there is no pressure. The inertia of said oil striking the flanks of the teeth 13 produces a coupling with the plate 12 which causes the nut 11 to turn on the screw 10 against the action of the spring 15 until the plate 12 is applied against the stop ring 19 rigidly connected to the hub 9. In this position, which is that shown in the figure, the teeth 8 and 13 are disengaged from one another and a narrow gap exists and is maintained between the two tapered surfaces of the teeth 8 and 13 by the hydraulic forces brought into action. A series of passages 20, inclined towards the shaft, enable the oil leaving the clutch and distributed in the chamber 21 to find an outlet, to mingle with the stream admitted to the clutch 8 and thus to re-enter the circuit of the auxiliary coupler.

The flow of the oil is more particularly as follows: It enters through the small pipe 5 of the coupler and feeds the latter, in a manner known per se, through the conduit 6. In order to cause the disengagement of the dog-clutch teeth 8 and 13, a portion of the oil is diverted from the normal circuit 5 of the coupler. Said portion first follows the path of the left arrow of Fig. 1, and centrifugal force flings it into the gaps between the teeth 8—13 of dog clutch. Owing to the baffle 18, the pressure of the oil is exerted on the set of teeth 13 and tends to separate the latter from the set of teeth 8. The device is not completely fluid-tight, and a flow forms which entrains the superfluous liquid between the conduit 6 and the baffle 18. This liquid unites again with the liquid which is sent directly to the coupler through the conduit 6. A part of the liquid withdrawn through the passage provided in the base plate of the conduit 5 passes directly between said plate and the baffle 18; another portion of the liquid, having acted by its centrifugal force on the sets of teeth, passes into the chamber 21, leaves said chamber through the orifices 20, and then mixes with the preceding portion.

According to another characteristic feature of the invention, the teeth 8 and 13 are cut on bodies of revolution having frusto-conical surfaces at the same angle to the apex. This arrangement provides the advantage of extending the engaging edge of the teeth and thus affording a greater rigidity of the clutch engagement.

It will be understood that the rotor 1, 3, 4 could be any member other than one of the members of a hydraulic coupler and that the invention is therefore not limited to such a mechanism.

I claim:

1. A device for connecting at rest a driven rotor member and a fixed member and for disconnecting said members with the driven member rotating in a given direction, said device comprising two dog-clutch elements connected respectively to the said rotor and fixed members and having respectively internal and external dog-clutch teeth provided on the said elements to co-operate with one another, a pressure spring connected between said members and tending to cause one of the said elements to move relatively to the other in the direction which engages the said teeth in one another, said dog-clutch elements and their teeth being adapted to operate as a hydraulic coupler to separate the teeth from one another when said coupler is supplied from a source of hydraulic pressure, and means for supplying a fluid to the rotor, rotation of the rotor providing a centrifugal force distributing the fluid amongst the teeth to couple the same hydraulically.

2. In a main hydraulic coupler comprising two coupled rotary members each in the form of substantially half a torus supported by a circular disc, one of which constitutes a centripetal turbine and the other a centrifugal pump, a device for retaining one of said members at rest and releasing it with the coupler operative, said device comprising, rigidly connected to one of the discs, a first dog-clutch member in the form of a circular ring having internal dog-clutch teeth, a second dog-clutch member in the form of an internally threaded circular plate comprising external dog-clutch teeth adapted to co-operate with the former by sliding of the two sets of teeth parallel to the axis of rotation, a fixed member coaxial with the said half toruses comprising an external thread to which the said plate is screwed and co-operating with the plate to define an annular chamber, a pressure spring tending to cause the said plate to turn on said fixed member in the direction which brings the two sets of dog-clutch teeth closer together, a baffle on the ring closing the ends of the teeth opposite the plate to define with the gaps between the teeth a space communicating with the annular chamber, a source of hydraulic pressure medium feeding the main hydraulic coupler, means for admitting the hydraulic pressure medium into the said chamber and space, and passages drilled through said plate to return the hydraulic medium to the main coupler, whereby the centrifugal force of the fluid admitted to the gaps between the teeth in the first dog-clutch member forces the fluid against the teeth of the second dog-clutch member and causes the second dog-clutch member to turn, against the action of the spring, in the direction which tends to separate the two sets of clutch teeth.

3. A device as claimed in claim 1, wherein the internal and external teeth define complementary cone frustums.

References Cited in the file of this patent

UNITED STATES PATENTS

| | | |
|---|---|---|
| 2,207,538 | Gaddoni | July 9, 1940 |
| 2,345,410 | Mierley | Mar. 28, 1944 |
| 2,386,285 | Zeidler | Oct. 9, 1945 |
| 2,423,820 | Baumann | July 15, 1947 |
| 2,671,543 | Bosch | Mar. 9, 1954 |
| 2,723,735 | Banker | Nov. 15, 1955 |